United States Patent
Beamish et al.

(10) Patent No.: US 11,745,400 B2
(45) Date of Patent: Sep. 5, 2023

(54) VENTED MOLD

(71) Applicant: Proprietect L.P., Toronto (CA)

(72) Inventors: Brian Beamish, North York (CA); Stephen T. McGrath, Brampton (CA); Kevin G. Kangas, Troy, MI (US)

(73) Assignee: Proprietect L.P., Toronto (CA)

( * ) Notice: Subject to any disclaimer, the term of this patent is extended or adjusted under 35 U.S.C. 154(b) by 0 days.

(21) Appl. No.: 15/756,140

(22) PCT Filed: Aug. 30, 2016

(86) PCT No.: PCT/CA2016/051021
§ 371 (c)(1),
(2) Date: Feb. 28, 2018

(87) PCT Pub. No.: WO2017/035644
PCT Pub. Date: Mar. 9, 2017

(65) Prior Publication Data
US 2018/0243954 A1 Aug. 30, 2018

Related U.S. Application Data

(60) Provisional application No. 62/212,109, filed on Aug. 31, 2015.

(51) Int. Cl.
*B29C 44/58* (2006.01)
*B29C 33/10* (2006.01)
(Continued)

(52) U.S. Cl.
CPC ............ *B29C 44/588* (2013.01); *B29C 33/10* (2013.01); *B29K 2075/00* (2013.01); *B29L 2031/58* (2013.01)

(58) Field of Classification Search
CPC ....... B29C 33/10; B29C 33/301; B29C 33/76; B29C 37/006; B29C 44/588
See application file for complete search history.

(56) References Cited

U.S. PATENT DOCUMENTS 2,898,632 A * 8/1959 Basil ..................... B29C 44/445
264/48
5,089,191 A 2/1992 Hughes
(Continued)

FOREIGN PATENT DOCUMENTS

EP 1225023 1/2001
JP 02122905 A * 5/1990 ......... B29C 44/0461
(Continued)

OTHER PUBLICATIONS

Kumasaka, English machine translation of JP-02122905-A, May 10, 1990 (Year: 1990).*
(Continued)

*Primary Examiner* — Christopher T Schatz
(74) *Attorney, Agent, or Firm* — McAndrews, Held & Malloy, Ltd.; Michael S. Tomsa

(57) ABSTRACT

A mold comprising a first mold element and a second mold element releasingly engagable between an open position and a closed position to define a mold cavity in the closed position and a first part line between the first mold element and second mold element. The first mold element comprises a first mold portion and a second mold portion configured to be reversible separable with respect to one another to define a second part line therebetween disposed interiorly with respect to a periphery of the first part line. At least one vent is disposed in the second part line. In one embodiment, the at least one vent comprises a passageway configured to permit mold material in the mold cavity to enter but not to exit the passageway to cause at least partial curing of the mold material in the passageway.

20 Claims, 12 Drawing Sheets

(51) Int. Cl.
  *B29L 31/58*   (2006.01)
  *B29K 75/00*   (2006.01)

(56) References Cited

U.S. PATENT DOCUMENTS

| | | | |
|---|---|---|---|
| 5,482,721 | A | 1/1996 | Clark et al. |
| 6,036,899 | A | 3/2000 | Iwai et al. |
| 6,829,795 | B2 | 12/2004 | Labish |
| 6,887,063 | B2 | 5/2005 | Moore et al. |
| 7,481,637 | B2 | 1/2009 | Cathcart et al. |
| 7,878,785 | B2* | 2/2011 | Cathcart ............. B29C 33/10 |
| | | | 425/4 R |
| 8,662,875 | B2 | 3/2014 | Lim et al. |
| 2004/0262798 | A1* | 12/2004 | Hori ................. B29C 44/588 |
| | | | 264/40.1 |
| 2005/0253293 | A1 | 11/2005 | Cathcart et al. |
| 2009/0092702 | A1 | 4/2009 | Cathcart et al. |

FOREIGN PATENT DOCUMENTS

| | | |
|---|---|---|
| JP | 2001 088147 A | 4/2001 |
| JP | 2002 307459 A | 10/2002 |
| JP | 3357141 | 12/2002 |
| JP | 2003-181839 | 7/2003 |
| JP | 2005-324552 | 11/2005 |
| JP | 2008-055610 | 3/2008 |
| JP | 2015-003595 | 1/2015 |

OTHER PUBLICATIONS

International Search Report and Written Opinion, dated Dec. 8, 2016, in International application No. PCT/CA2016/051021, filed Aug. 30, 2016.
Examination report for European Application No. 16840463.0, dated Apr. 9, 2019, pp. 1-32, European Patent Office, Germany.
Canada Office Action for Canadian Application No. 2,996,708, dated Aug. 28, 2019, pp. 1-3, Canadian Patent Office.
Chinese Office Action and English translation for Chinese Application No. 201680050518.3, dated Sep. 6, 2019, pp. 1-14, Chinese Patent Office.
Brazil Office Action Report Notification for Brazilian Application No. BR112018003920-9, dated Feb. 18, 2020, pp. 1-4, Brazilian Patent Office, Rio de Janeiro.
Canada Office Action for Canadian Application No. 2,996,708, dated Apr. 15, 2020, pp. 1-3, Canadian Patent Office.

* cited by examiner

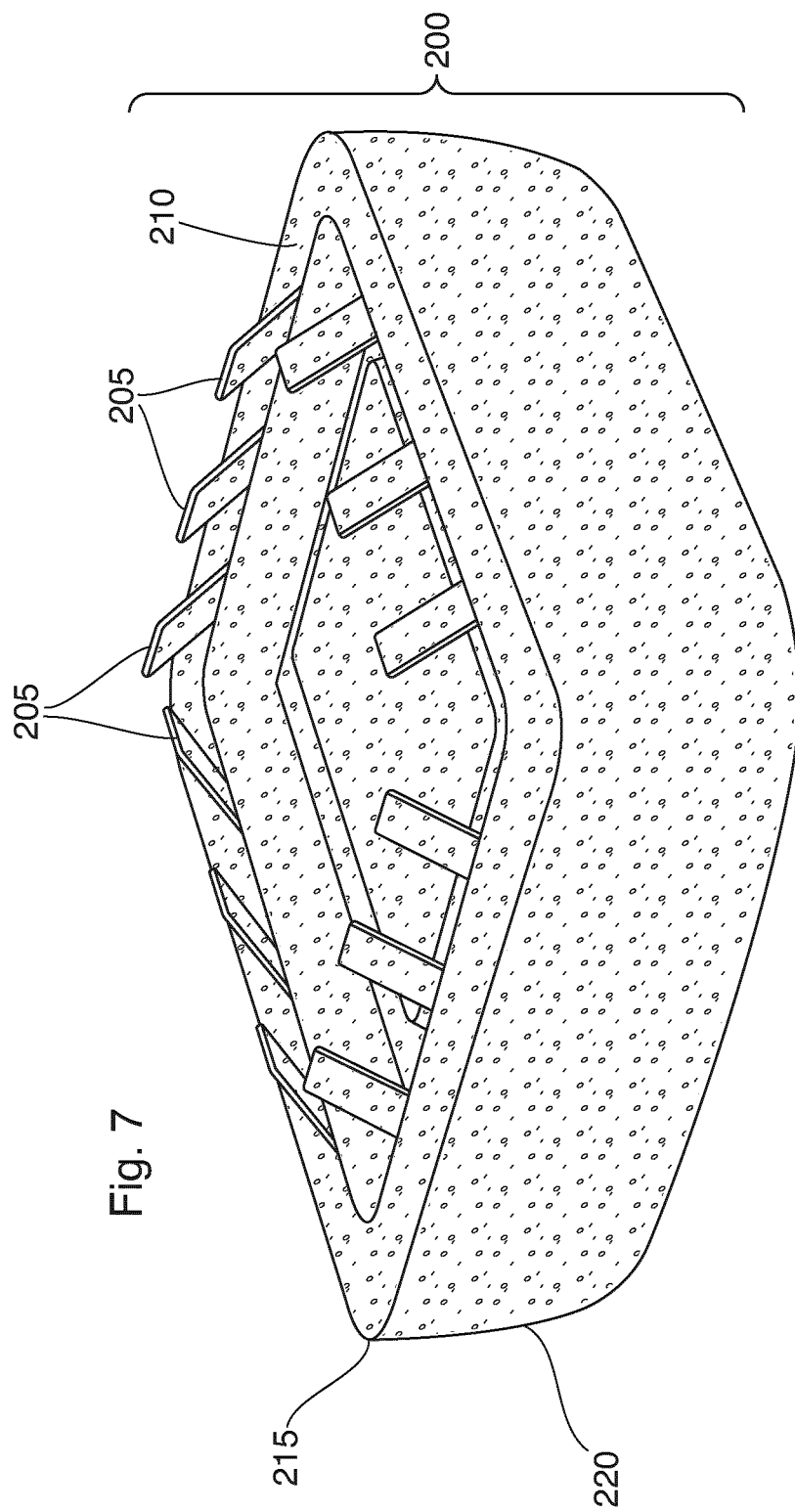

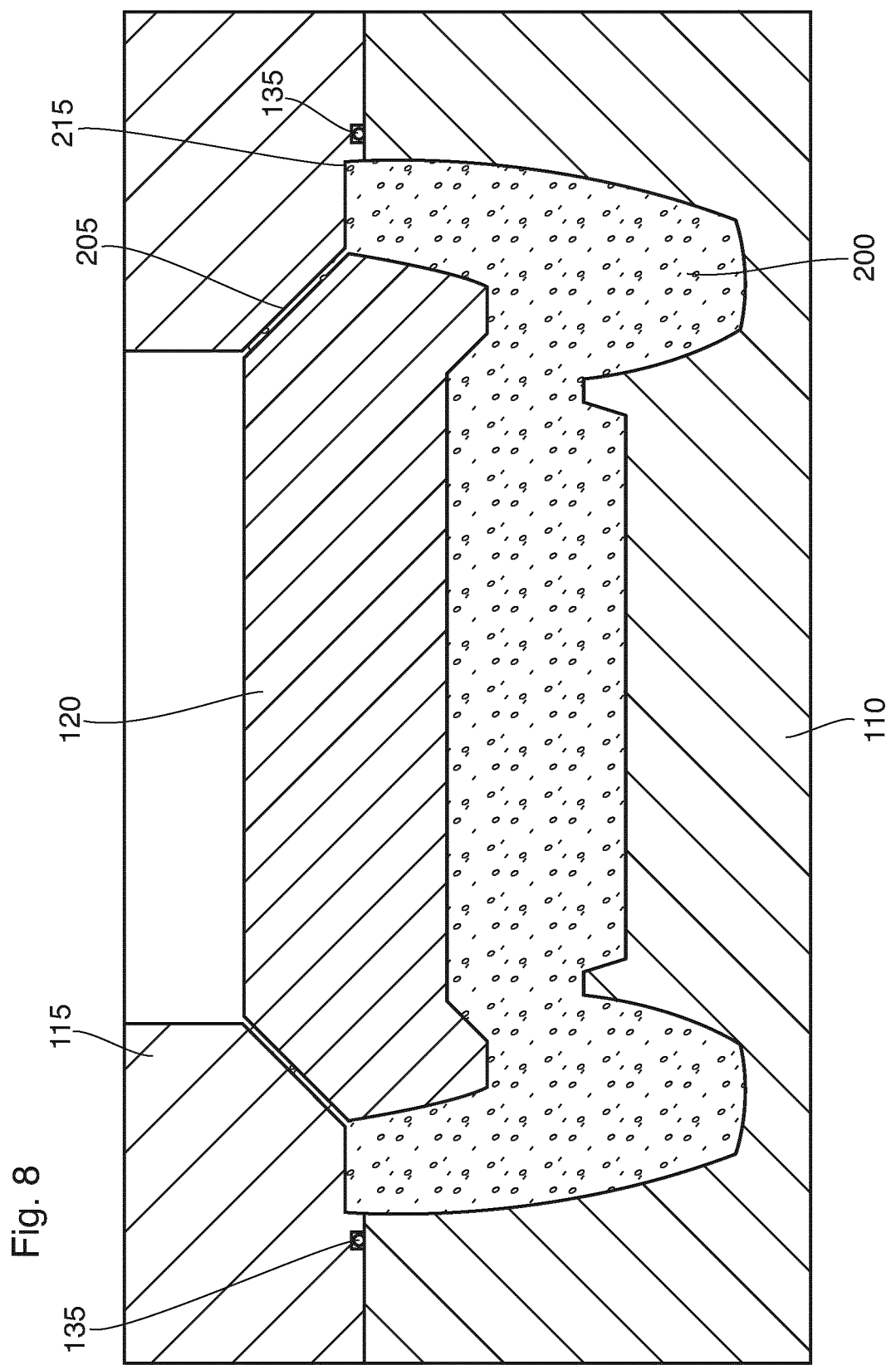

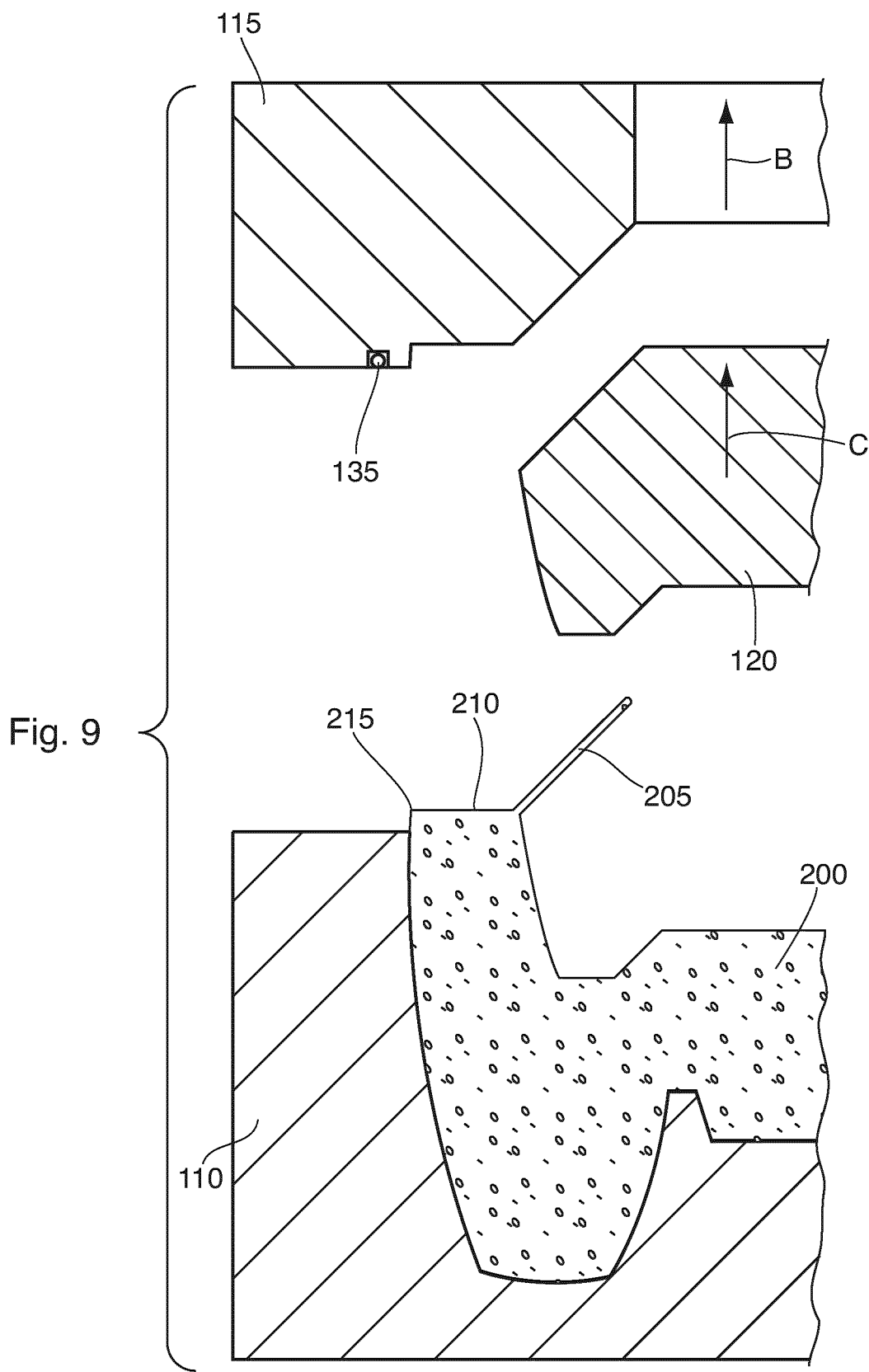

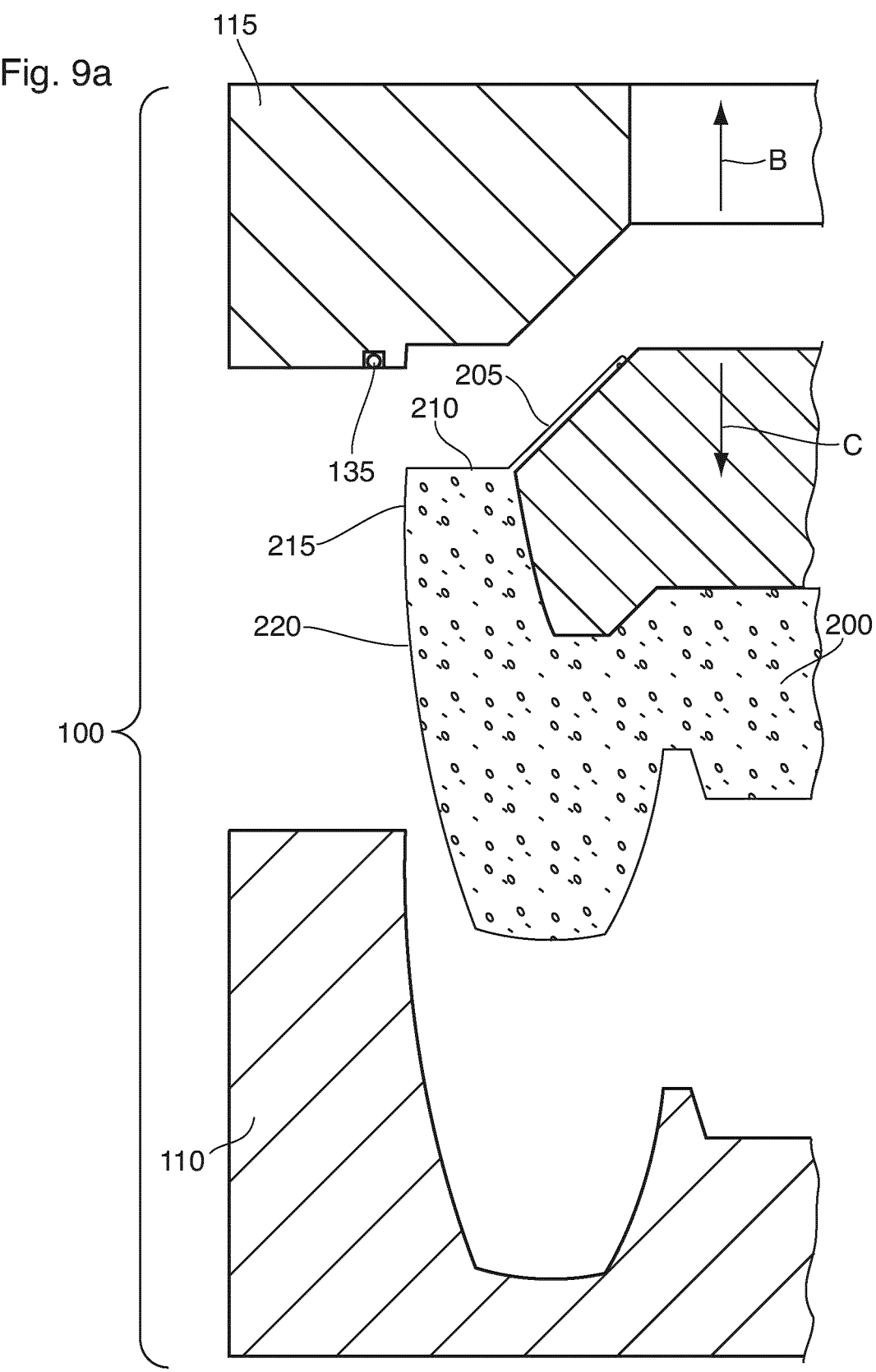

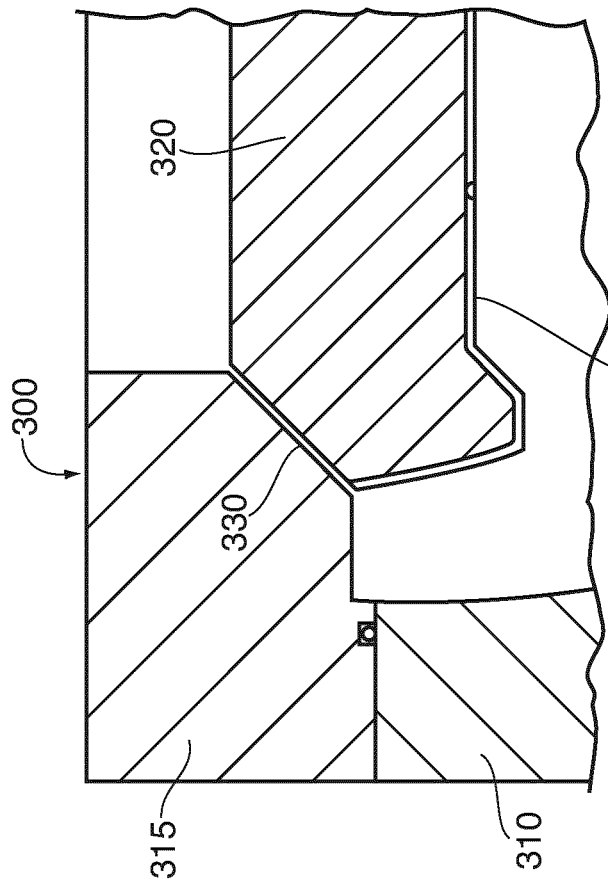
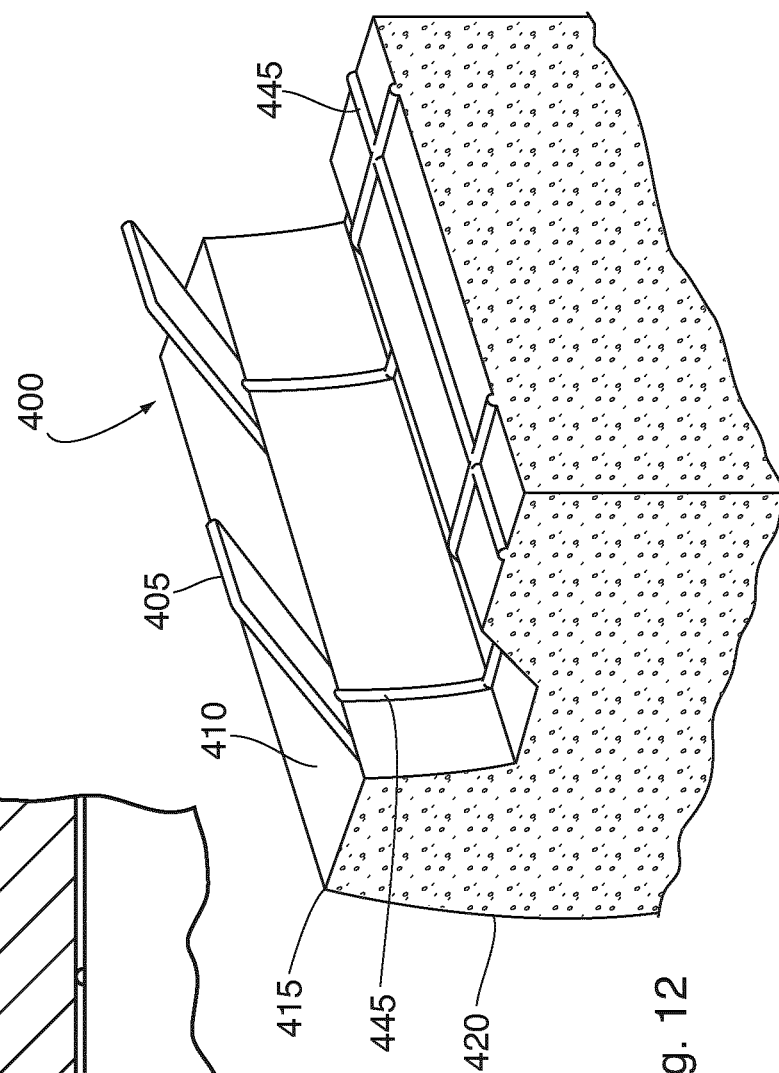

VENTED MOLD

CROSS-REFERENCE TO RELATED APPLICATION

The present application is a National Phase Entry of PCT International Application No. PCT/CA2016/051021, which was filed on Aug. 30, 2016, and claims the benefit under 35 U.S.C. § 119(e) of U.S. provisional patent application Ser. No. 62/212,109, filed Aug. 31, 2015, the contents of which are hereby incorporated by reference.

BACKGROUND OF THE INVENTION

Field of the Invention

The present invention relates to an improved mold for producing molded articles. In its most preferred embodiment, the venting on the present invention is positioned such that the extrusion of raw material into the vent is achieved exclusively on the B-surface of the molded article, obviating the requirement to remove the extruded raw material prior to the application of a trim or finish cover.

Description of the Prior Art

Many articles are produced by putting raw materials into a cavity in a mold wherein the raw material undergoes a physical change (e.g., it expands or foams) and the article produced thus acquires the shape of the cavity. This technique is commonly employed for producing molded articles made from polymeric foams such as polyurethane foam, latex (e.g., natural and styrene-butadiene rubber) foam and the like.

For example, automotive seats are commonly manufactured from polyurethane cushions which are molded to shape and then covered with a vinyl, cloth or leather finish cover (also known as a "trim cover"). Polyurethane foams are somewhat unique in that foaming and at least a portion of the polymerization process occur simultaneously. Thus, in the production of polyurethane foam using, for example, a conventional cold foam technique, a typical formulation comprises:

1. a polyol (resin),
2. water (indirect blow agent),
3. tetramethyl ethandiamine (catalyst),
4. dimethyl ethanolamine, and
5. a polyisocyanate.

The mixture is dispensed into a mold using a suitable mixing head, after which the mold is then closed to permit the expanding mass within it to be molded. Accordingly, it is convenient generally to refer to the mixture initially dispensed into the mold as "a liquid foamable polymeric composition" or, in this case, "a liquid foamable polyurethane composition". As the composition expands in the mold, polymerization occurs and the polymer so formed becomes solidified.

When molding a liquid foamable polymeric composition to form articles such as polyurethane foam articles, it is conventional to use a clam-shell mold comprising a bottom mold and a top mold which, when closed, define a mold cavity. The mold is opened, the liquid foamable polyurethane composition is dispensed into the mold cavity and the mold is closed as a chemical reaction causes the composition to expand. After the mold is closed, the composition expands to fill the interior cavity of the mold. Alternatively, the composition may be dispersed into a closed mold. In either case, as the polymerization reaction is completed, the foam cures and permanently assumes the shape of the mold cavity.

As is known to those of skill in the art, it is essential during this process that the mold be adequately vented to allow the air present in the mold to exit the mold as the foamable composition expands. Further, it is essential to allow a portion of the gases (typically $CO_2$ in the production of polyurethane) generated during polymerization to exit the mold.

Failure to adequately vent the mold results in defective molded articles exhibiting symptoms of improper foaming such as surface hardening (or foam densification) and/or void formation in the finished article due to trapped gas or air bubbles. At the other extreme, excess venting of the mold will also result in defective molded articles due to collapse of the foam prior to curing; this phenomenon is often referred to as the 'souffle' effect. Thus, proper venting of molds is an important factor in producing molded articles of an acceptable quality.

Typically, first generation clam-shell molds have been designed with drilled out or cut passages in the top mold to provide vents. Locating, sizing and deciding upon the number of these vents is a matter of some skill on the part of mold designer and the production engineers, and is often an iterative procedure with more vents being added to various locations or other vents being blocked-off after test runs have been made.

During molding operations some liquid foamable polymeric composition which moves into the vent is wasted. It is generally desired to minimize the amount of wasted material (also known as "flash", "mushrooms", "buds", "pancakes" and the like) for two reasons, namely (1) the wasted material adds to the overall expense of chemicals required to produce the finished article, and (2) the wasted material must be removed from the molded article prior to the finish cover being applied, thereby necessitating additional labour and the costs associated therewith.

As will be developed below, improvements to venting during such molding operations have advanced the art to a certain degree. However, mold designers and production engineers are continually striving to optimize the compromise between providing enough venting at the proper locations while avoiding excess venting and minimizing material wastage during venting.

The conventional approach for venting involved placing a vent on a surface of the mold. The result was protruding raw material that was later removed from the molded article, adding labor and waste to the production process. Improved venting techniques added vents at the conventional ("first") part line (e.g., a so-called "ribbon vent" discussed below). Vented molds that produce thin ribbons of foam have gained popularity over the last 20 years. However, as seat designs became more complicated and trim cover materials have become thinner, there are instances where the ribbons on the foam part can be seen through the trim cover. Thus, despite the advances made in the development of vented molds which produce thin ribbons of foam material, there remains the need to address the problem of having to remove those ribbons in cases where they can be seen through the trim cover after the part is finished.

SUMMARY OF THE INVENTION

It is an object of the present invention to obviate or mitigate at least one of the above-mentioned disadvantages of the prior art.

It is another object of the present invention to provide a novel mold.

Accordingly, in one of its aspects, the present invention provides a mold comprising:

a first mold element and a second mold element releasingly engagable between an open position and a closed position to define a mold cavity in the closed position and a first part line between the first mold element and second mold element;

the first mold element comprising a first mold portion and a second mold portion configured to be reversible separable with respect to one another to define a second part line there between disposed interiorly with respect to a periphery of the first part line;

at least one vent disposed in the second part line, the at least one vent comprising a passageway configured to permit mold material in the mold cavity to enter but not to exit the passageway to cause at least partial curing of the mold material in the passageway.

In another of its aspects, the present invention provides a mold comprising:

a first mold element and a second mold element releasingly engagable between an open position and a closed position to define a mold cavity in the closed position and a first part line disposed about a periphery of the first mold element and second mold element;

the first mold element comprising an annular mold portion and central mold portion configured to be reversible separable with respect to one another to define a second part line about a periphery of the central mold portion, the second part line being disposed interiorly with respect to the first part line;

at least one vent disposed in the second part line, the at least one vent comprising a passageway configured to permit mold material in the mold cavity to enter but not to exit the passageway to cause at least partial curing of the mold material in the passageway.

In another of its aspects, the present invention provides a mold comprising:

a first mold element and a second mold element releasingly engagable between an open position and a closed position to define a mold cavity in the closed position and a first part line between the first mold element and second mold element;

the first mold element comprising a first mold portion and a second mold portion configure to be reversible separable with respect to one another to define a second part line there between disposed interiorly with respect to a periphery of the first part line;

at least one vent disposed in the second part line, the at least one vent comprising a passageway thickness in the range of from about 0.002 inches to about 0.030 inches.

Thus the present inventors have developed a novel mold with improved venting techniques, particularly a mold for the production of foamed articles. The approach is quite different from that used in the past.

The approach developed by the present inventors is effectively to create a second part line in the mold which corresponds to the underside or B-surface of the finished part. This approach is different than the conventional approach in that the conventional approach produces ribbons at an intersection between the side of the foam part (technically the A-surface) and the B-surface. By incorporating a second part line, interiorly of the conventional part line, the inventors then placed the vents in the second part line and, in a highly preferred embodiment, seal the conventional part line to prevent any mold material from entering that part line. The molded part still produces one or more ribbons of mold material attached to the part but these ribbons are now placed entirely at the B-surface of the molded part which means that once a trim cover is applied thereto, the ribbon or ribbons attached to the molded part cannot be seen through the trim cover. Thus, the present mold can be used to produce a molded product having one or more ribbons which do not have to be removed even when a thin trim cover is used to cover the part.

BRIEF DESCRIPTION OF THE DRAWINGS

Embodiments of the present invention will be described with reference to the accompanying drawings, wherein like reference numerals denote like parts, and in which:

FIG. 7 illustrates a molded article produced in the mold illustrated in FIGS. 5 and 6;

FIG. 8 illustrates a cross section of the mold illustrated in FIGS. 5 and 6 shown in production of a molded article;

FIG. 9 illustrates a partial sectional view of a first sequence of demolding the molded article produced using the mold illustrated in FIG. 8 (the mold elements and portions are in the open position and appendage attached to molded article);

FIG. 9a illustrates a partial sectional view of a second sequence of demolding the molded article produced using the mold illustrated in FIG. 8 (the mold elements and portions are in the open position and appendage attached to molded article);

FIG. 11 illustrates a cross section of a portion of a mold in accordance with a preferred embodiment of the present invention;

FIG. 12 illustrates a portion of a molded product produced by the mold illustrated in FIG. 11.

DETAILED DESCRIPTION OF THE PREFERRED EMBODIMENTS

Figure 1:
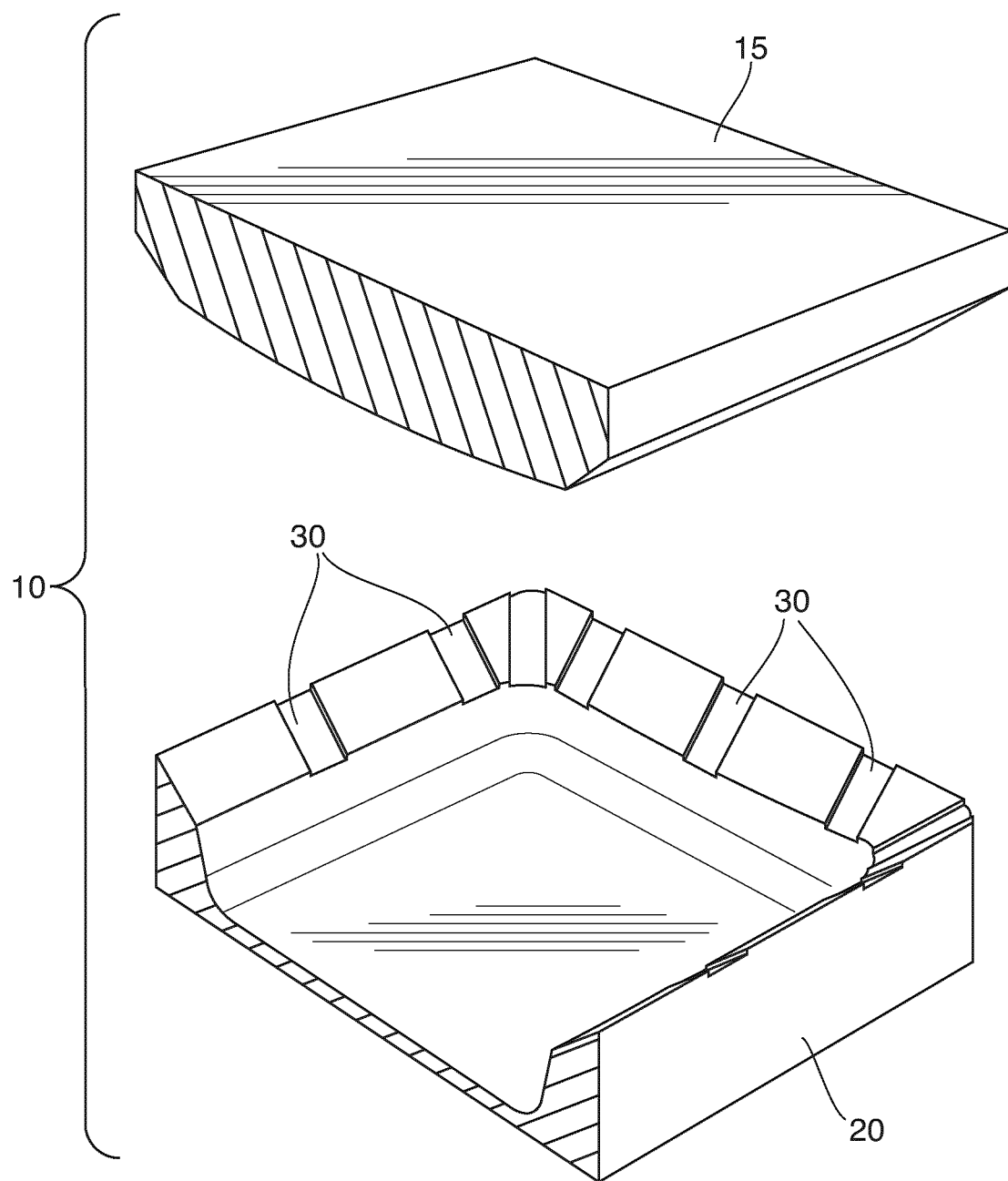
FIG. 1 illustrates a perspective view of a prior art mold.

The present invention relates to a novel mold substantially as illustrated by and described in connection with at least one of the figures, as set forth more completely in the claims. Preferred embodiments of this mold may include any one or a combination of any two or more of any of the following features:

the passageway has a substantially rectangular cross-section so that the at least partially cured mold material within said the passageway has a ribbon shape;

the passageway has a thickness in the range of from about 0.002 inches to about 0.030 inches;

the passageway has a thickness in the range of from about 0.005 inches to about 0.020 inches;

the passageway has a thickness in the range of from about 0.002 inches to about 0.030 inches, and a width which is continuous around the parting line—preferably the width is up to about 6 inches;

the passageway has a thickness in the range of from about 0.005 inches to about 0.020 inches, and a width which is continuous around the parting line—preferably the width is up to about 6 inches;

the first mold portion is substantially annular to define an open central portion and the second mold portion is configured to reversibly fit in the open central portion;

the first mold portion and the second mold portion are configured to be linearly moveable with respect to one another;

the first mold portion and the second mold portion are configured to be non-linearly moveable with respect to one another;

the first mold portion and the second mold portion are configured to be pivotally moveable with respect to one another;

the mold further comprises a first motive element configured to move the first mold portion with respect to the second mold portion;

the mold further comprises a first motive element configured to separate the first mold portion from the second mold portion;

the first motive element is mechanical;

the first motive element is hydraulic the first motive element is pneumatic;

the first motive element is configured to separate the first mold portion and the second mold portion prior to removal of a molded element from the mold cavity;

the first motive element is configured to separate the first mold portion and the second mold portion after removal of a molded element from the mold cavity;

the mold further comprises a second motive element configured to releasably engage the first element and the second mold element between the open position and the closed position;

the second motive element is configured to disposed the first mold element and the second mold element in the open position prior to separation of the first mold portion and the second mold portion;

the second motive element is configured to disposed the first mold element and the second mold element in the open position after to separation of the first mold portion and the second mold portion;

the mold further comprises a sealing element configured to seal the first part line in the closed position of the mold;

the sealing element is disposed on the first mold element;

the sealing element is disposed on the second mold element;

the sealing element comprises a first sealing element disposed on the first mold element and a second sealing element disposed on the second mold element;

the sealing element is configured to substantially prevent ingress of mold material into the first part line the mold comprises a plurality of spaced apart vents disposed in the second part line;

the mold further comprises at least one groove element disposed on at least a portion of a surface the first mold element defining the mold cavity;

the mold further comprises a plurality of groove elements disposed on at least a portion of a surface the first mold element defining the mold cavity;

the mold further comprises a plurality of interconnected groove elements disposed on at least a portion of a surface the first mold element defining the mold cavity;

the mold further comprises a plurality of groove elements disposed on at least a portion of a surface the first mold element defining the mold cavity, at least one of the groove elements being in fluid communication with at least one of the plurality of vents; and/or the mold further comprises a plurality of groove elements disposed on at least a portion of a surface the first mold element defining the mold cavity, at least some of the plurality of the groove elements being in fluid communication with at least some of the plurality of vents.

Prior to describing preferred embodiments of the present invention, the following is a discussion of a prior art mold and a foam product produced therefrom in accordance with U.S. Pat. No. 5,356,580 (Re. 36,413), U.S. Pat. No. 5,482,271 (Re. 36,572) and U.S. Pat. No. 5,587,183 [all in the name of Clark et al. (Clark)].

Figure 2:
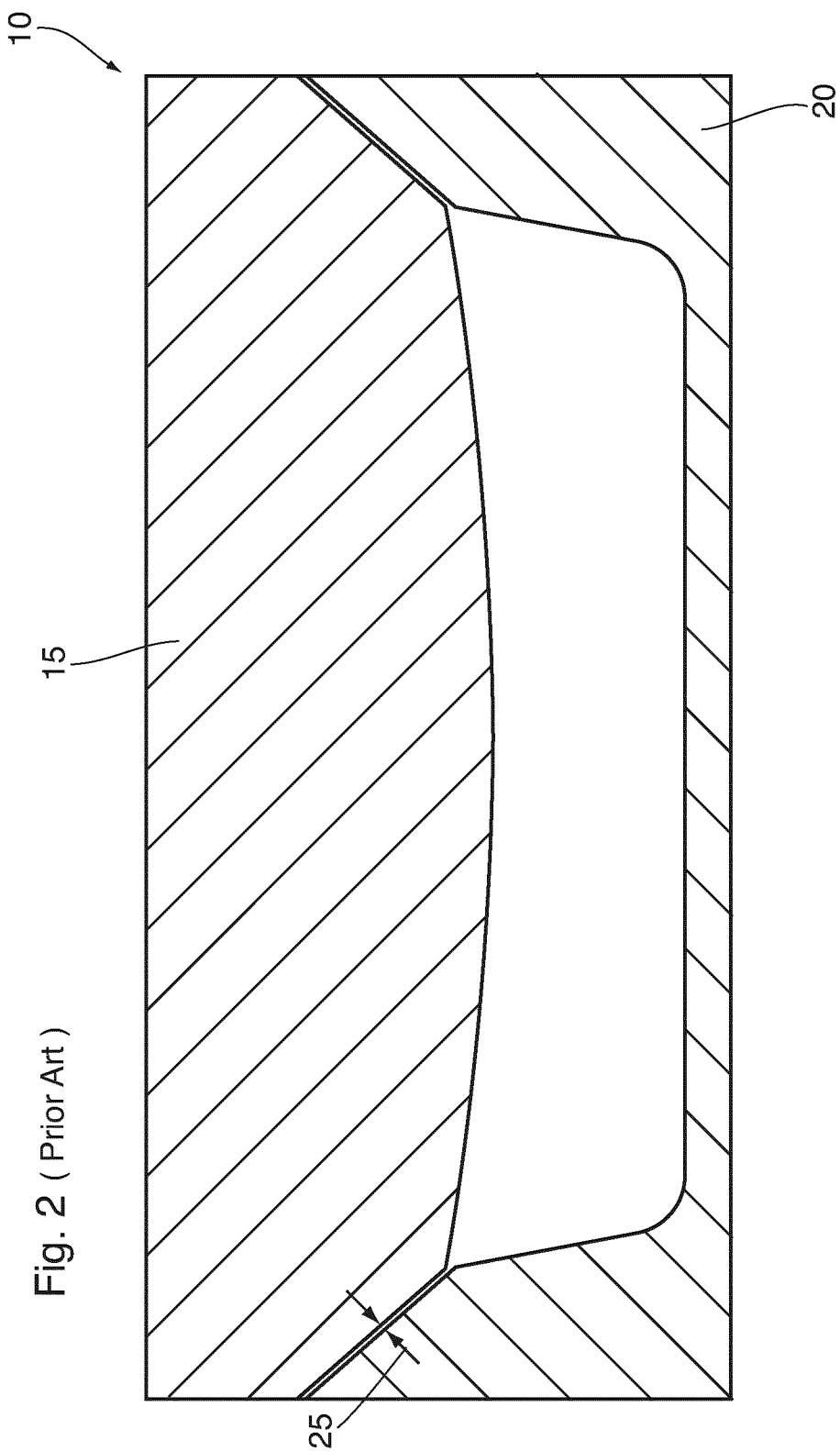
FIG. 2 illustrates cross section of the mold illustrated in FIG. 1 when the mold is closed.

Thus, with reference to FIGS. 1-2, there is illustrated a mold 10 comprising a lid 15 and a bowl 20. FIG. 1 illustrates mold 10 in the so-called open position and FIG. 2 illustrates mold 10 in the so-called closed position.

With reference to FIG. 2, a part line 25 is defined between lid 15 and bowl 20 when mold 10 is in the closed position.

With reference to FIG. 1, a series of passageways 30 are disposed in the portion of bowl 20 that corresponds to part line 25.

Figures 3, 4:
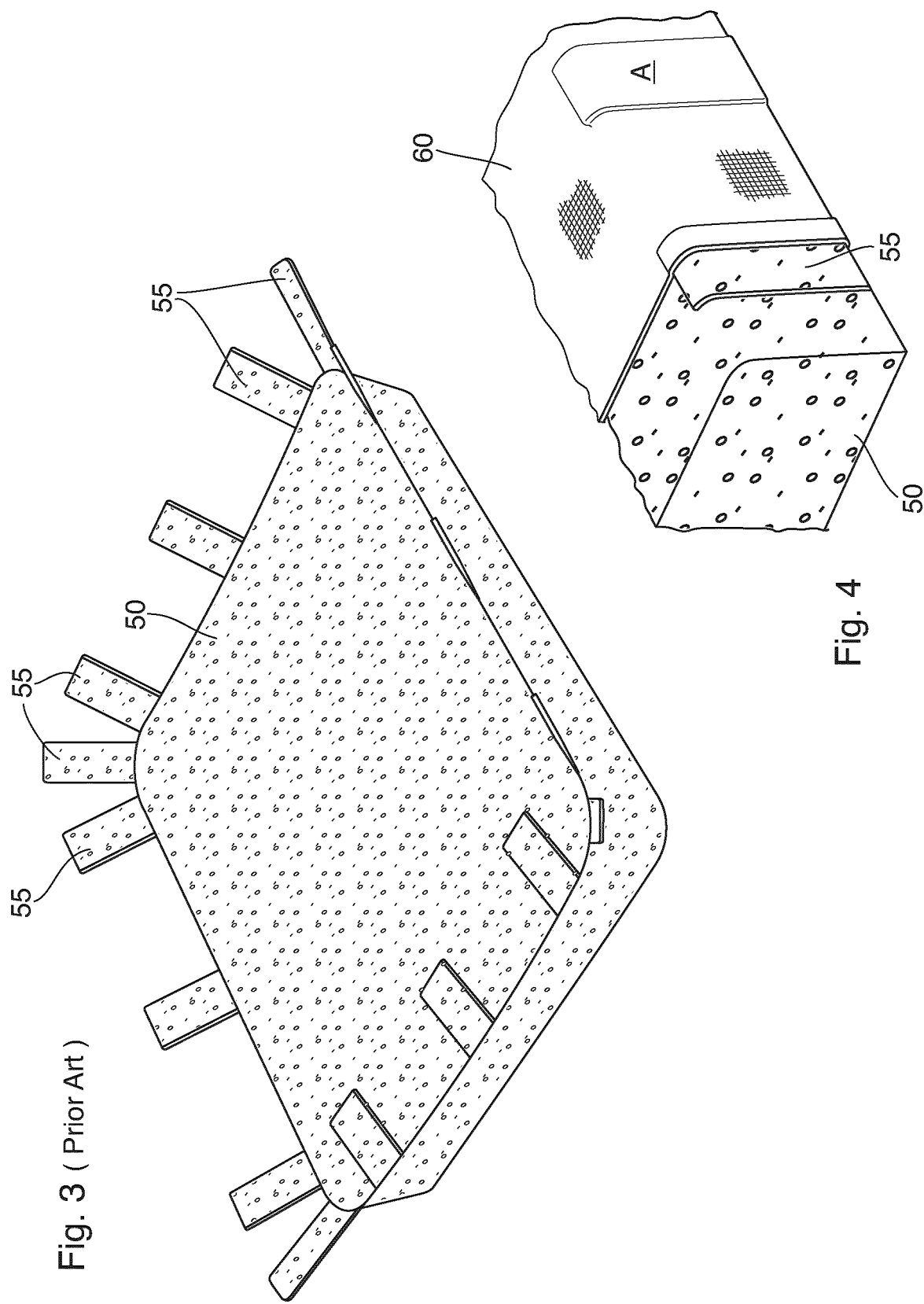
FIG. 3 illustrates a molded article produced in the prior art mold illustrated in FIGS. 1 and 2.
FIG. 4 illustrates a sectional view of a molded article from FIG. 3 after application of a trim cover.

FIG. 3 illustrates foam part 50 that has been produced in mold 10 illustrated in FIGS. 1-2. As shown, foam part 50 comprises a series of ribbons 55 which have been produced by foam material entering passageways 30 in bowl 20.

FIG. 4 illustrates the problem referred to above. Specifically, when a relatively thin trim cover 60 is disposed over foam part 50, an impression of ribbons 55 can be seen through trim cover 60 as designated by A.

As can be further seen in FIG. 3, ribbons 55 are produced at the intersection between the underside (i.e., the B-surface) of foam part 50 and the side portion (i.e., the A-surface) of a foam part 50.

Figure 5:
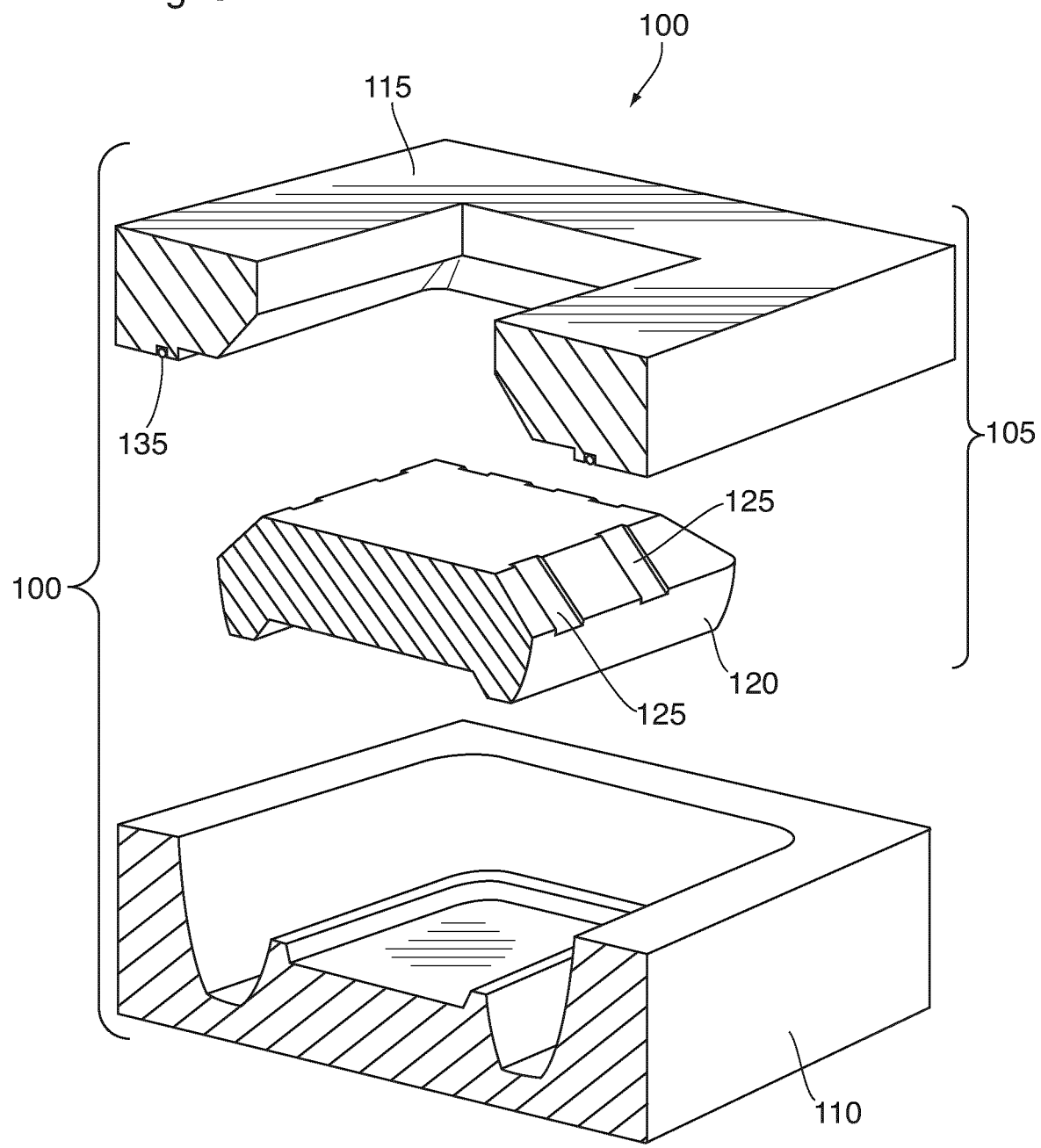
FIG. 5 illustrates a perspective view of a mold in accordance with a preferred embodiment of the present invention.

With reference to FIG. 5, there is illustrated in schematic form, a mold 100 which is a preferred embodiment of the present invention. Mold 100 comprises a lid 105 and a bowl 110. Lid 105 is effectively a two part structure and comprises an annular mold portion 115 and a central portion 120. A series of vent passageways 125 are disposed in central mold portion 120.

Figure 6:
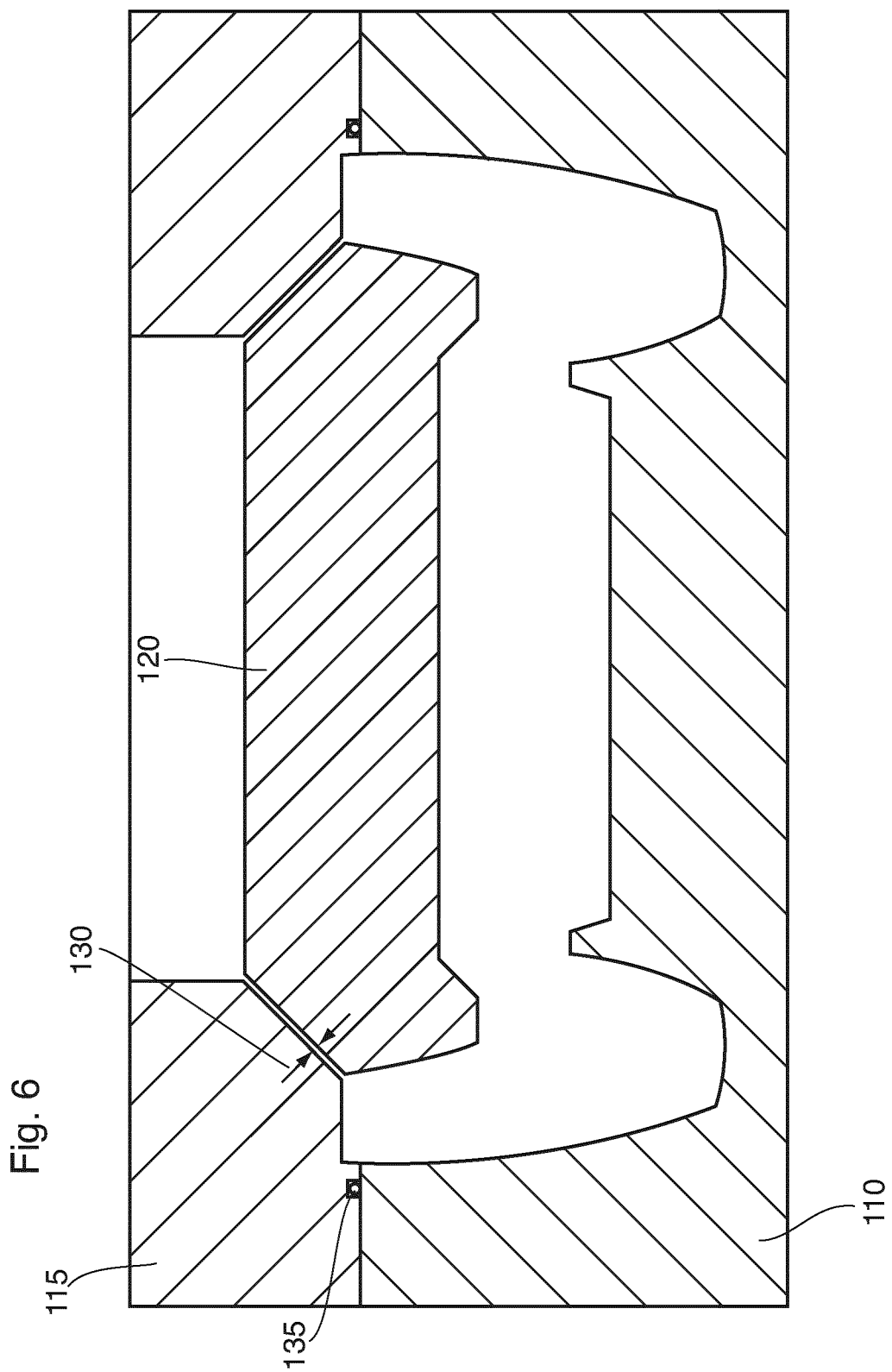
FIG. 6 illustrates a cross section of the mold illustrated in FIG. 5.

As shown with reference to FIG. 6, annular mold portion 115 and central mold portion 120 are configured to fit together and form a part line 130. Vent passageways 125 disposed in part line 130 are preferably configured in a manner similar to that disclosed in Clark.

In a highly preferred embodiment, annular mold portion 115 comprises a seal 135 along the periphery thereof. Seal 135 is configured to contact a surface of bowl 110 and form a substantially fluid tight seal therewith—see FIG. 6. The provision of such a seal effectively means that in the closed position of the mold, all venting occurs at part line 130—i.e., substantially no venting takes place at the part line between annular mold portion 115 and bowl 110. In certain aspects, the seal 135, or other sealing element, may be composed of a plurality of selecting elements, such as a first sealing element and a second sealing element. For example, the first sealing element may disposed on the first mold element (e.g., lid) and the second sealing element disposed on the second mold element (e.g., bowl) to define the seal 135 at the periphery.

Consequently, when a foam part is produced in mold 100, ribbons can be formed by foam material entering passageways 125 but these ribbons are disposed entirely on the underside (B-surface of the foam part). This is illustrated in FIGS. 7-8.

Thus, there is illustrated a foam part 200 having a series of foam ribbons 205 which are connected to underside 210 (B-surface) of foam part 200. The provision of seal 135 in mold 100 prevents the formation of ribbons along an edge 215 between the underside 210 and a side wall 220 of foam part 200.

Figure 10:
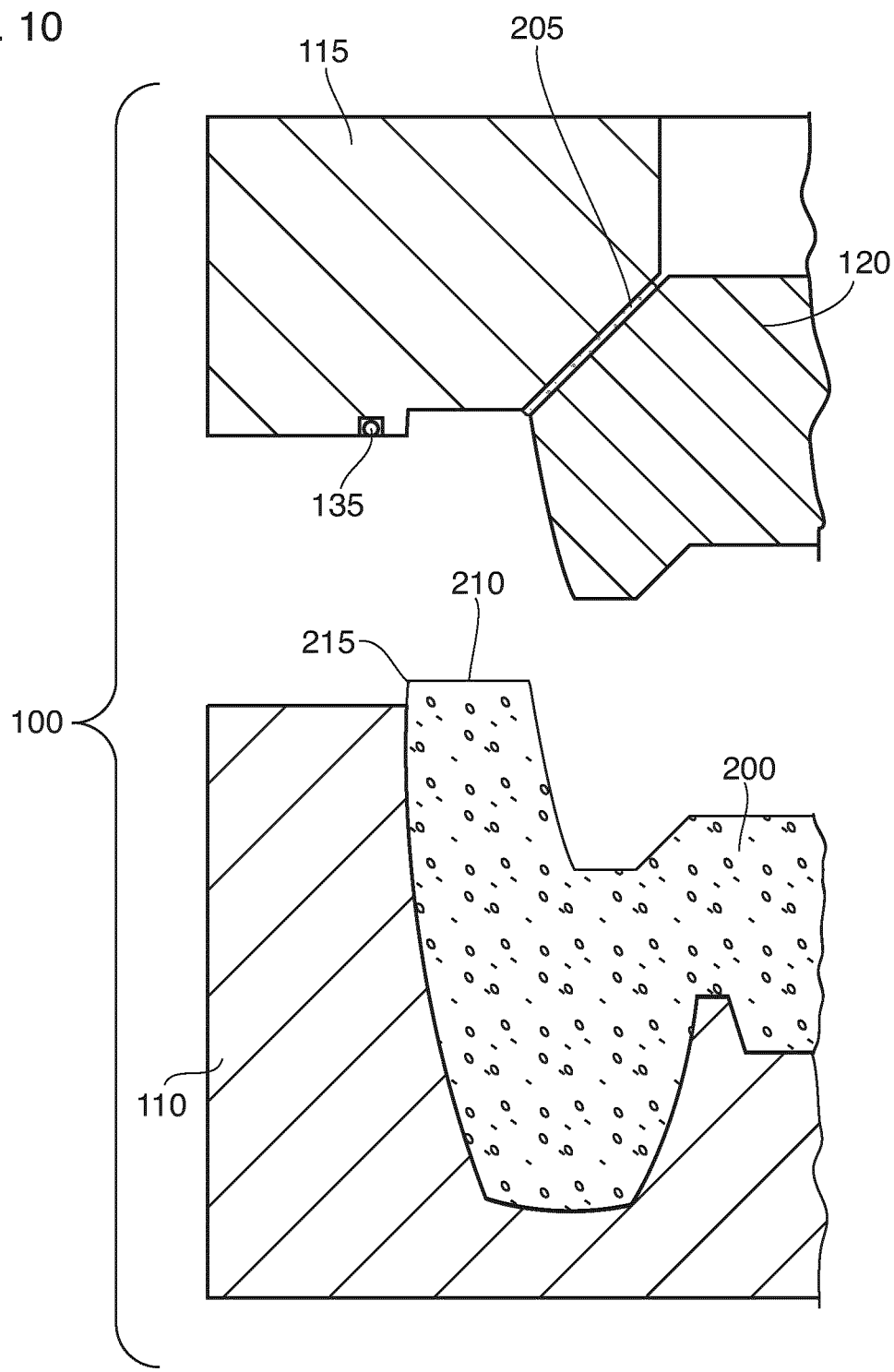
FIG. 10 illustrates a partial sectional view of a third sequence of demolding the molded article produced using the mold illustrated in FIG. 8 (the mold elements are in the open position with the appendage remaining between the first portion and second portion)

FIGS. 9, 9a and 10 illustrate various sequences for for demolding foam part 200 from mold 100.

In a first sequence, in FIG. 9, once foaming is complete, annular mold portion 115 and central mold portion 120 are moved sequentially in a direction of arrows B and C, respectively. This allows ribbons 205 to remain attached to foam part 200 which can then be removed from bowl 110.

In a sequence, with reference to FIG. 9a, once foaming is complete, annular mold portion 115 and central mold portion 120 are moved simultaneously along with foam part 200 in a direction of arrow B. Ribbons 205 trapped between annular mold portion 115 and central mold portion 120 aid in the extraction of the foam part 200 from bowl 110. Once foam part 200 is extracted from bowl 110, central mold portion 120 is then moved away from annular mold portion 115 in direction C. The foam part 200 remains attached to central mold portion 120. This allows ribbons 205 to remain attached to foam part 200.

In a third sequence, with reference to FIG. 10, annular portion 115 and central mold portion 120 are moved together which has the effect of pinching ribbons 205 and removing them from foam part 200. This can result in production of a foam part that is completely free of ribbons.

The manner by which annular mold portion 115 and central mold portion 120 are moved with respect one another is not shown for clarity. The selection of a suitable motive element or means to achieve this movement is within the purview of an ordinary person skill in the art. For example, these mold portions may be moved mechanically, hydraulically or pneumatically.

Figure 13:
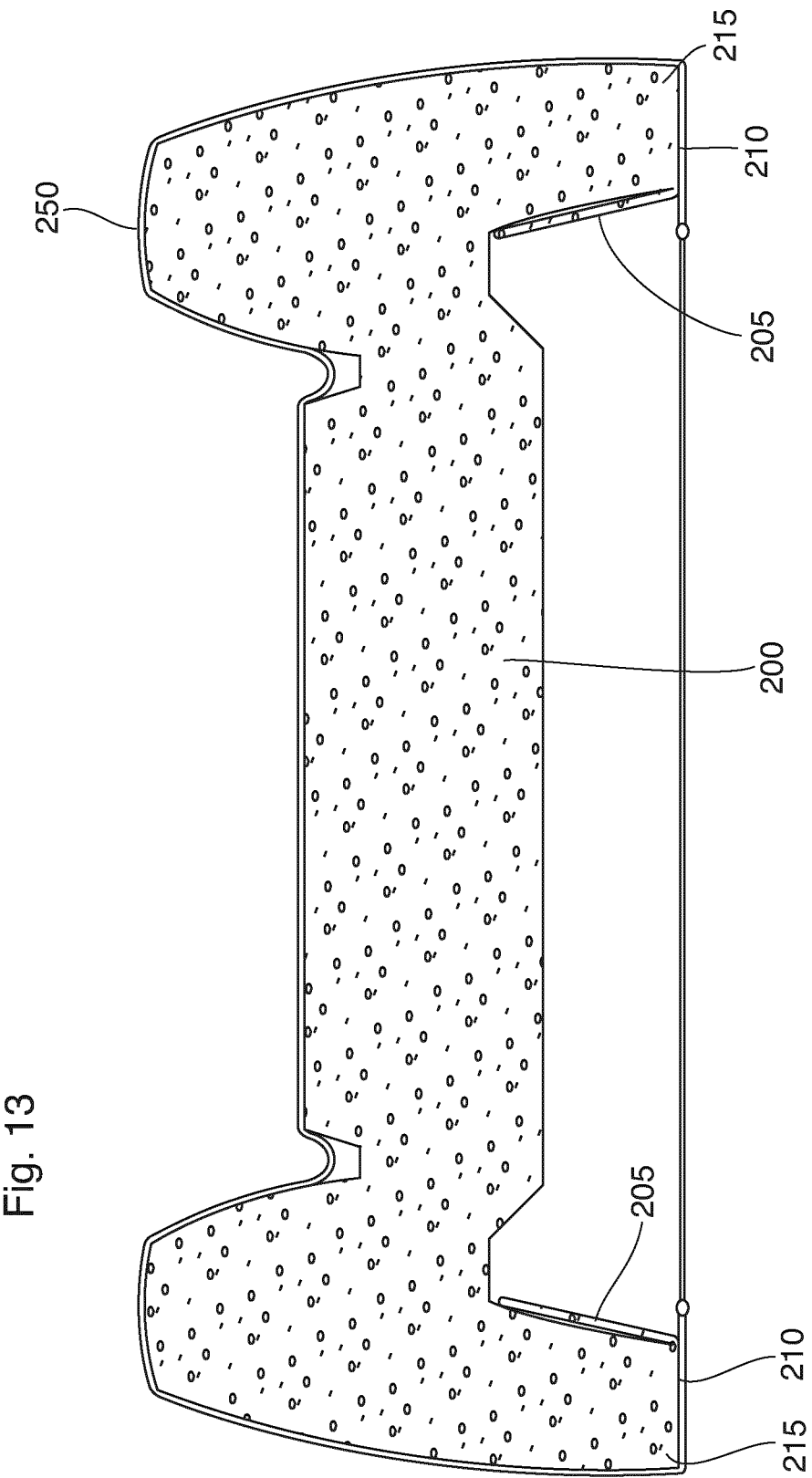
FIG. 13 illustrates a molded article produced through the process illustrated by FIG. 8 after application of a trim cover.

With reference to FIG. 13, there is illustrated foam part 200 from FIG. 7 after application of a trim cover 250. As can be understood from FIG. 13, ribbons 205 attached to foam part 200 would not be visible under trim cover 250 once foam part 200 is installed in a vehicle.

With reference to FIGS. 11-12, there is illustrated a portion of a mold 300 and a corresponding portion of a foam part 400 produced from mold 300. In FIGS. 6 and 11, similar elements are denoted with the same last two reference numerals. Thus, bowl 110 in FIG. 6 corresponds with bowl 310 in FIG. 11, etc. The modification in mold 300 shown in FIG. 11 is that central mold portion 320 has been modified to include a network of grooves 350 on a portion thereof. The design and arrangement of grooves 350 is described in more detail in U.S. Pat. Nos. 7,481,637, 7,878,785, 7,366, 429 and 8,850,644 [Cathcart et al. (Cathcart)].

The corresponding foam part 400 produced in mold 300 is shown in FIG. 12. Again, with reference to FIGS. 7 and 12, similar elements are denoted with the same last two reference numerals. As can be seen, foam part 400 includes a series of 445 corresponding to grooves 350 in mold 300 shown in FIG. 11.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. A mold system comprising:
a molded part; and
a first mold element and a second mold element releasingly engagable between an open position and a closed position to define a mold cavity for the molded part in the closed position and a first part line between the first mold element and second mold element;
the first mold element comprising a first mold portion and a second mold portion configured to be separable with respect to one another to define a second part line therebetween disposed interiorly with respect to a periphery of the first part line;
at least one vent disposed in the second part line, the at least one vent comprising an open passageway configured to permit mold material in the mold cavity to enter but not to exit the open passageway to cause at least partial curing of the mold material in the open passageway, the open passageway being free of any obstruction between the mold cavity and an exterior of the mold;
wherein (i) the second part line is positioned to correspond to a B-surface of the molded part, and (ii) the open passageway is configured such that mold material entering the passageway is attached entirely to the B-surface of the molded part; and
wherein the mold comprises the molded part disposed in the mold cavity and molded material attached to the molded part disposed in the at least one vent.

2. The mold defined in claim 1, wherein the open passageway has a substantially rectangular cross-section so that any at least partially cured mold material within said the open passageway has a ribbon shape.

3. The mold defined in claim 1, wherein the open passageway defines a cross-section having a thickness and a width, wherein the thickness is in a range of from about 0.002 inches to about 0.030 inches, and the width is up to about 6 inches.

4. The mold defined in claim 1, wherein the first mold portion defines an open central portion and the second mold portion is configured to reversibly fit in the open central portion.

5. The mold defined in claim 1, wherein the first mold portion and the second mold portion are configured to be linearly moveable with respect to one another.

6. The mold defined in claim 1, further comprising a first motive element configured to separate the first mold portion from the second mold portion.

7. The mold defined in claim 1, further comprising a second motive element configured to releasably engage the first mold element and the second mold element between the open position and the closed position.

8. The mold defined in claim 1, further comprising a sealing element configured to seal the first part line in the closed position of the mold.

9. The mold defined in claim 8, wherein the sealing element comprises a first sealing element disposed on the first mold element and a second sealing element disposed on the second mold element.

10. The mold defined in claim 8, wherein the sealing element is configured to substantially prevent ingress of mold material into the first part line.

11. The mold defined in claim 1, comprising a plurality of spaced apart vents disposed in the second part line.

12. The mold defined in claim 1, further comprising at least one groove element disposed on at least a portion of a surface the first mold element defining the mold cavity.

13. The mold defined in claim 1, further comprising a plurality of groove elements disposed on at least a portion of a surface the first mold element defining the mold cavity.

14. The mold defined in claim 1, further comprising a plurality of interconnected groove elements disposed on at least a portion of a surface the first mold element defining the mold cavity.

15. The mold defined in claim 1, further comprising a plurality of groove elements disposed on at least a portion of a surface the first mold element defining the mold cavity, at least one of the groove elements being in fluid communication with the at least one vent.

16. The mold defined in claim 11, further comprising a plurality of groove elements disposed on at least a portion of a surface the first mold element defining the mold cavity, at least some of the plurality of the groove elements being in fluid communication with at least some of the plurality of spaced apart vents.

17. A mold system comprising:
a molded part; and
a first mold element and a second mold element releasingly engagable between an open position and a closed position to define a mold cavity for the molded part in the closed position and a first part line disposed about a periphery of the first mold element and second mold element;
the first mold element comprising an annular mold portion and central mold portion configured to be separable with respect to one another to define a second part line about a periphery of the central mold portion, the second part line being disposed interiorly with respect to the first part line;
at least one vent disposed in the second part line, the at least one vent comprising an open passageway configured to permit mold material in the mold cavity to enter but not to exit the open passageway to cause at least partial curing of the mold material in the open passageway, the open passageway being free of any obstruction between the mold cavity and an exterior of the mold;
wherein (i) the second part line is positioned to correspond to a B-surface of the molded part, and (ii) the open passageway is configured such that mold material entering the open passageway is attached entirely to the B-surface of the molded part.

18. A mold system comprising:
a molded part; and
a first mold element and a second mold element releasingly engagable between an open position and a closed position to define a mold cavity for the molded part in the closed position and a first part line between the first mold element and second mold element;
the first mold element comprising a first mold portion and a second mold portion configure to be separable with respect to one another to define a second part line therebetween disposed interiorly with respect to a periphery of the first part line;
at least one vent disposed in the second part line, the at least one vent comprising an open passageway that defines a cross-section having a thickness in a range of from about 0.002 inches to about 0.030 inches, the open passageway being free of any obstruction between the mold cavity and an exterior of the mold;
wherein (i) the second part line is positioned to correspond to a B-surface of the molded part, and (ii) the open passageway is configured such that mold material entering the open passageway is attached entirely to the B-surface of the molded part.

19. The mold defined in claim 17, wherein the mold comprises the molded part disposed in the mold cavity and molded material attached to the molded part disposed in the at least one vent.

20. The mold defined in claim 18, wherein the mold comprises the molded part disposed in the mold cavity and molded material attached to the molded part disposed in the at least one vent.

* * * * *